(12) United States Patent
Ueda

(10) Patent No.: US 10,768,607 B2
(45) Date of Patent: Sep. 8, 2020

(54) MACHINING DEVICE AND CORRECTION VALUE DETERMINATION METHOD

(71) Applicant: DGSHAPE Corporation, Hamamatsu-shi, Shizuoka (JP)

(72) Inventor: Jun Ueda, Hamamatsu (JP)

(73) Assignee: DGSHAPE CORPORATION, Shizuoka (JP)

( * ) Notice: Subject to any disclaimer, the term of this patent is extended or adjusted under 35 U.S.C. 154(b) by 5 days.

(21) Appl. No.: 16/395,295

(22) Filed: Apr. 26, 2019

(65) Prior Publication Data

US 2019/0346832 A1    Nov. 14, 2019

(30) Foreign Application Priority Data

May 8, 2018    (JP) .................................. 2018-090265

(51) Int. Cl.
*G05B 19/4155* (2006.01)

(52) U.S. Cl.
CPC ................. *G05B 19/4155* (2013.01); *G05B 2219/33099* (2013.01)

(58) Field of Classification Search
CPC ............ B23Q 17/2233; G05B 19/4155; G01B 21/045
See application file for complete search history.

(56) References Cited

U.S. PATENT DOCUMENTS

| 2002/0189120 A1 | 12/2002 | Kaneda et al. |
| 2014/0012420 A1* | 1/2014 | Yasue ................ G05B 19/4067 700/264 |
| 2017/0138717 A1 | 5/2017 | Kanja et al. |
| 2018/0079009 A1 | 3/2018 | Fujii |

FOREIGN PATENT DOCUMENTS

JP    2017-087400 A    5/2017

* cited by examiner

*Primary Examiner* — Mark A Connolly
(74) *Attorney, Agent, or Firm* — Keating & Bennett, LLP

(57) ABSTRACT

A controller of a machining device includes an X correction value determiner to determine an X correction value based on an X coordinate value obtained when a detection tool clamped by a clamp is brought into contact with a predetermined X reference point, a Y correction value determiner to determine a Y correction value based on a Y coordinate value obtained when the detection tool clamped by the clamp is brought into contact with a predetermined Y reference point, an actual length determiner to determine an actual length of the detection tool clamped by the clamp, and a Z correction value determiner to determine a Z correction value based on the X correction value, the Y correction value, the actual length of the detection tool, and the design length of the detection tool.

14 Claims, 12 Drawing Sheets

MACHINING DEVICE AND CORRECTION VALUE DETERMINATION METHOD

CROSS REFERENCE TO RELATED APPLICATIONS

This application claims the benefit of priority to Japanese Patent Application No. 2018-090265 filed on May 8, 2018. The entire contents of this application are hereby incorporated herein by reference.

BACKGROUND OF THE INVENTION

1. Field of the Invention

The present invention relates to a machining device and a correction value determination method. Specifically, the present invention relates to a machining device and a correction value determination method for determining a correction value that is used when positioning a plurality of components of the machining device using a detection tool, wherein the correction value is a correction value for a coordinate value of a pre-set measurement point that is used for positioning.

2. Description of the Related Art

Conventional machining devices are known in the art for producing an object of an intended shape out of a workpiece by cutting the workpiece. Such a machining device performs a cutting process based on a machining program including a plurality of machining steps. The machining device includes a main body having a machining space therein in which a workpiece is cut, a clamp that is placed in the machining space and clamps a machining tool, a spindle that rotates the clamp, and a support that is placed in the machining space and supports the workpiece. The clamp and the support are configured so that they can be moved in three-dimensional directions relative to each other.

Changing the relative position between the clamp and the support changes the position at which the machining tool and the workpiece come into contact with each other. It is possible to produce an object of an intended shape out of the workpiece by cutting the workpiece while changing the relative positions of the clamp and the support.

With the machining device, a positioning process of positioning components of the machining device is performed at predetermined times, such as when shipped out of a factory and when replacing the components. The components include a clamp, a spindle, a support, etc., for example. In the positioning process, first, a detection tool is clamped by the clamp. The detection tool clamped by the clamp is brought into contact with a pre-set measurement point, thus obtaining the coordinate values of the measurement point. Then, a positioning correction value used for performing the positioning process is calculated based on the coordinate values obtained by the detection tool and the design coordinate values of the measurement point. Then, the components of the machining device are positioned based on the positioning correction value.

However, when the detection tool is clamped by the clamp, the detection tool may be clamped in a slanted position by the clamp. When the measurement point is obtained with the detection tool in a slanted position, the coordinate values of the measurement point may deviate. When the components of the machining device are positioned by using the positioning correction value calculated based on the coordinate values of the deviated measurement point, it may not be possible to properly perform the positioning.

In view of this, it is known in the art to calculate the positioning correction value using a correction value for correcting the slant (hereinafter referred to as the slant correction value) even when the detection tool is clamped in a slanted position by the clamp. FIG. 10A is a diagram showing a detection tool 300 in a non-slanted position according to a conventional technique. FIG. 10B is a diagram showing the detection tool 300 in a slanted position according to the conventional technique. For example, as shown in FIG. 10A, when the detection tool 300 is clamped by the clamp while extending in the Z-axis direction (herein, the up-down direction), wherein the detection tool 300 is in a non-slanted position, i.e., when the slant correction value is 0, the X coordinate value and the Y coordinate value of the measurement point obtained by the detection tool 300 will not deviate.

However, when the detection tool 300 is clamped by the clamp in a slanted position as shown in FIG. 10B, the X coordinate value and the Y coordinate value of the measurement point obtained by the detection tool 300 will deviate depending on the rotation angle of the detection tool 300. The rotation angle of the detection tool 300 indicated by a solid line in FIG. 10B is 0°, and the rotation angle of the detection tool 300 indicated by a phantom line is 180°. As described above, since the position of the clamp (in other words, the upper end of the detection tool 300) varies depending on the rotation angle of the detection tool 300, there occurs an error in the coordinate value of the measurement point. In order to eliminate such an error, the positioning process is performed by calculating the positioning correction value while taking the slant correction value into consideration. The slant correction value is calculated as follows, for example.

Herein, the slant correction value for the X-axis direction is referred to as the X correction value. The slant correction value for the Y-axis direction is referred to as the Y correction value. The X correction value and the Y correction value are calculated by a procedure as follows, for example, as disclosed in Japanese Laid-Open Patent Publication No. 2017-87400.

When calculating the X correction value and the Y correction value, the detection tool 300 is brought into contact with a correction jig supported on a support. The reference point M100 is pre-set on the surface of the correction jig, for example. When calculating the X correction value, for example, the X coordinate value with the detection tool 300 brought into contact with the reference point M100 with the rotation angle of the detection tool 300 being 0°, and the X coordinate value with the detection tool 300 brought into contact with the reference point M100 with the rotation angle of the detection tool 300 being 180° are obtained. Then, the X correction value is calculated based on the two X coordinate values. The Y correction value can be calculated by a similar procedure.

However, when the detection tool 300 is clamped in a slanted position, there occurs a deviation also in the Z-axis direction, as well as in the X-axis direction and the Y-axis direction. There may be cases where proper positioning cannot be done because of this.

SUMMARY OF THE INVENTION

Preferred embodiments of the present invention provide machining devices and correction value determination methods capable of appropriately positioning components of the machining device.

A machining device according to a preferred embodiment of the present invention is a machining device placed in a space of an XYZ rectangular coordinate system capable of positioning a plurality of components of the machining device using a detection tool, and determining a correction value for a coordinate value of a measurement point that is pre-set for the positioning. The machining device includes a clamp, a spindle, a support, a conveyor and a controller. The clamp is capable of selectively clamping one of a machining tool and a detection tool. The spindle is provided on the clamp and extends in a Z-axis direction. The support is capable of selectively supporting one of a workpiece and a correction jig. The conveyor moves the clamp in three-dimensional directions relative to the support. An X reference point located at an end in an X-axis direction and a Y reference point located at an end in a Y-axis direction are pre-set on a surface of either one of the correction jig and the support. The controller is configured or programmed to include a storage, an X correction value determiner, a Y correction value determiner, an actual length determiner and a Z correction value determiner. The storage stores a design length of the detection tool. The X correction value determiner determines an X correction value, which is the correction value for the X-axis direction, based on an X coordinate value obtained when the detection tool clamped by the clamp is brought into contact with the X reference point. The Y correction value determiner determines a Y correction value, which is the correction value for the Y-axis direction, based on a Y coordinate value obtained when the detection tool clamped by the clamp is brought into contact with the Y reference point. The actual length determiner determines an actual length in the Z-axis direction of the detection tool clamped by the clamp by measuring the actual length of the detection tool. The Z correction value determiner determines a Z correction value, which is the correction value for the Z-axis direction, based on the X correction value, the Y correction value, the actual length of the detection tool and the design length of the detection tool.

The machining device determines the Z correction value based not only on the X correction value and the Y correction value, but on the X correction value, the Y correction value, the actual length of the detection tool, and the design length of the detection tool. Therefore, the X coordinate value, the Y coordinate value and the Z coordinate value of the measurement value for positioning are corrected based on the X correction value, the Y correction value and the Z correction value, respectively. Thus, the Z coordinate value is also corrected, as well as the X coordinate value and the Y coordinate value of the measurement value. Thus, it is possible to perform a precise positioning process by performing a positioning process of positioning the components of the machining device using the corrected measurement value.

A correction value determination method according to a preferred embodiment of the present invention is a correction value determination method for use with a machining device placed in a space of an XYZ rectangular coordinate system capable of positioning a plurality of components of the machining device using a detection tool, wherein the method is for determining a correction value for a coordinate value of a measurement point that is pre-set for the positioning. The machining device includes a clamp that is capable of clamping the detection tool. An X reference point and a Y reference point are pre-set on the machining device. The correction value determination method includes an X correction value determining step, a Y correction value determination step, an actual length determination step and a Z correction value determination step. The X correction value determining step determines an X correction value, which is the correction value for an X-axis direction, based on an X coordinate value when the detection tool clamped by the clamp is brought into contact with the X reference point. The Y correction value determination step determines a Y correction value, which is the correction value for a Y-axis direction, based on a Y coordinate value when the detection tool clamped by the clamp is brought into contact with the Y reference point. The actual length determination step determines an actual length in a Z-axis direction of the detection tool clamped by the clamp by measuring the actual length of the detection tool. The Z correction value determination step determines a Z correction value, which is the correction value for the Z-axis direction, based on the X correction value determined in the X correction value determining step, the Y correction value determined in the Y correction value determination step, the actual length of the detection tool determined in the actual length determination step, and the design length of the detection tool.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Machining devices and methods according to preferred embodiments of the present invention will now be described with reference to the drawings. Note that it is understood that the preferred embodiments illustrated herein are not intended to limit the scope of the present invention.

Figure 1:
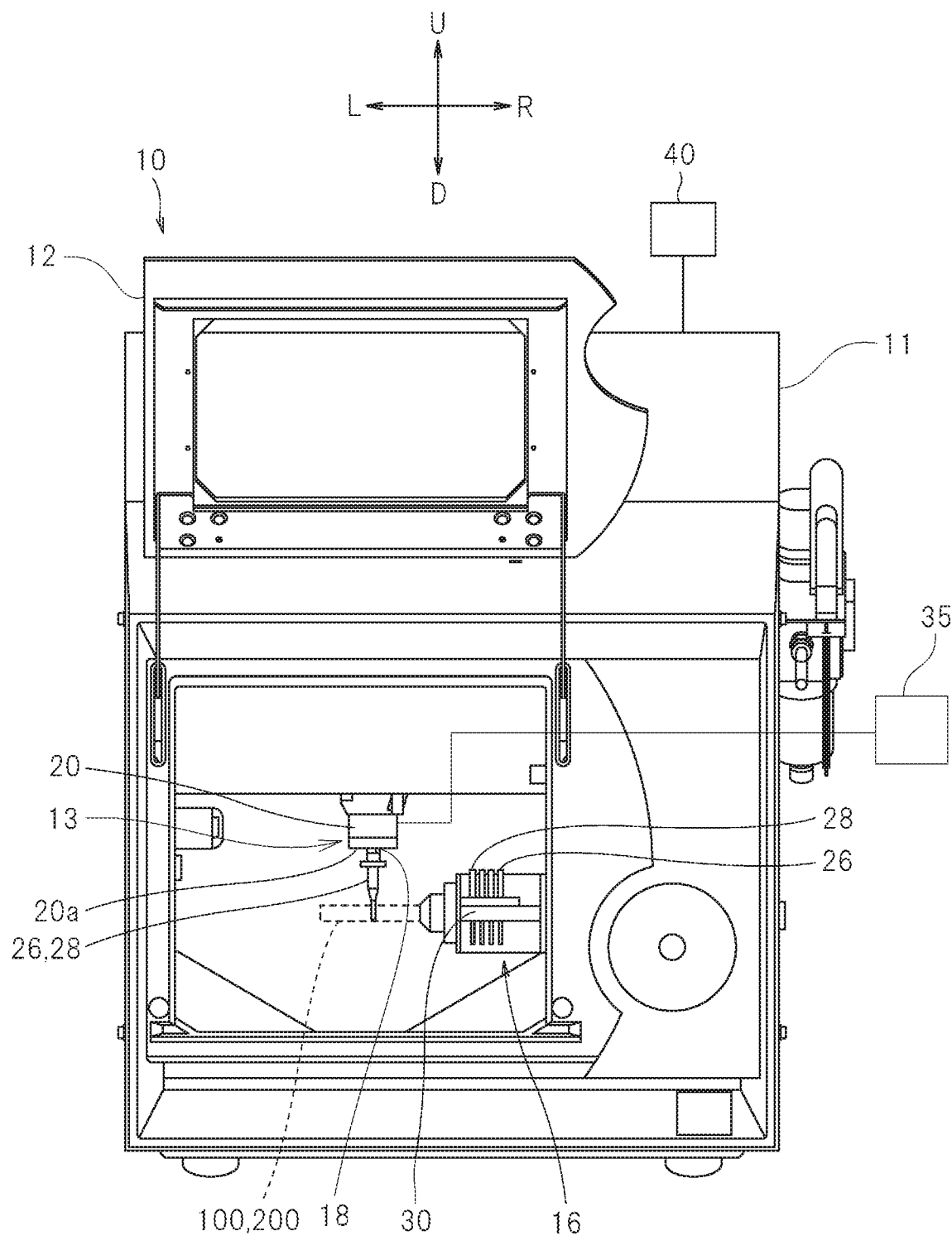
FIG. 1 is a front view showing a machining device according to a preferred embodiment of the present invention.

FIG. 1 is a front view showing a machining device 10 of the present preferred embodiment, with a cover 12 opened. In the following description, as the machining device 10 is seen from the front side, the direction away from the machining device 10 will be referred to as "front", and the direction toward the machining device 10 as "rear". The terms "left", "right", "up" and "down" refer to these directions as the machining device 10 is seen from the front side. The designations F, Rr, L, R, U and D, as used in the figures, refer to front, rear, left, right, up and down, respectively. Note however that these directions are defined merely for the purpose of discussion, and do not in any way limit how the machining device 10 is placed. In the present preferred embodiment, the left-right direction represents the X-axis direction. The front-rear direction represents the Y-axis direction. The up-down direction represents the Z-axis direction. In the present preferred embodiment, the machining device 10 is placed in a space of an XYZ coordinate system. It is assumed that the position of each component, etc., of the machining device 10 is represented by coordinates of the XYZ rectangular coordinate system.

As shown in FIG. 1, the machining device 10 produces an object by cutting a workpiece 200 using a machining tool 26. While there is no particular limitation on the type of object, the object may be a dental prosthesis, for example. A dental prosthesis may be an inlay, a crown, a bridge, etc., for example. In the present preferred embodiment, the machining device 10 is a device that is used in the dental field and produces a dental prosthesis. Note however that the machining device 10 may be a device that is used in a field other than the dental field.

The machining device 10 includes a main body 11 that has a space inside and preferably has a box shape, and the cover 12. The front portion of the main body 11 is opened. The cover 12 is attached to the main body 11 so that it can open/close the opening of the main body 11.

The machining device 10 is a device that has a so-called auto tool changer. The machining device 10 is configured or programmed so as to automatically select one tool from among a plurality of machining tools 26 and a detection tool 28. The machining device 10 includes a machining mechanism 13, a support 16 and a magazine 30.

The machining mechanism 13 is placed in the space inside the main body 11. The machining mechanism 13 includes a clamp 18 and a spindle 20. The clamp 18 selectively clamps one tool selected from among the machining tools 26 and the detection tool 28. The spindle 20 is provided on the clamp 18. In the present preferred embodiment, the spindle 20 is provided on an upper portion of the clamp 18. The spindle 20 extends in the Z-axis direction and rotates about the Z axis. The spindle 20 rotates the clamp 18 and a machining tool 26 or the detection tool 28 clamped by the clamp 18 about the Z axis. The magazine 30 is placed inside the main body 11. The magazine 30 accommodates the detection tool 28 and the machining tools 26.

A machining tool 26 is used when cutting the workpiece 200 and includes a cutter on the bottom thereof. The detection tool 28 is a tool that is used when positioning the components of the machining device 10. Herein, the components of the machining device 10 include the machining mechanism 13, the support 16, the magazine 30, etc., for example. The bottom of the detection tool 28 does not have a cutter, but is a smooth surface.

The support 16 is placed in the space inside the main body 11. The support 16 supports either the workpiece 200 or a correction jig 100. Herein, the correction jig 100 is a jig that is used when positioning the components of the machining device 10. There is no particular limitation on the material of the correction jig 100. The correction jig 100 may be a metal, for example.

The machining device 10 includes a conveyor 35. The conveyor 35 is a mechanism that moves the machining mechanism 13 (in other words, the clamp 18) in three-dimensional directions relative to the support 16. In the present preferred embodiment, the conveyor 35 is configured or programmed to move the machining mechanism 13 in the X-axis direction and in the Z-axis direction, for example. Also, the conveyor 35 is configured or programmed to move the support 16 in the Y-axis direction, for example.

As shown in FIG. 1, the machining device 10 includes a controller 40. The controller 40 is configured or programmed to perform operations such as controlling the cutting of the workpiece 200. The controller 40 is a microcomputer, for example, and is provided inside the main body 11. The controller 40 includes a central processing unit (CPU), a ROM storing programs to be executed by the CPU, a RAM, etc., for example. Herein, operations such as controlling the machining of the workpiece 200 are performed by using the program(s) stored in the microcomputer.

Figure 2:
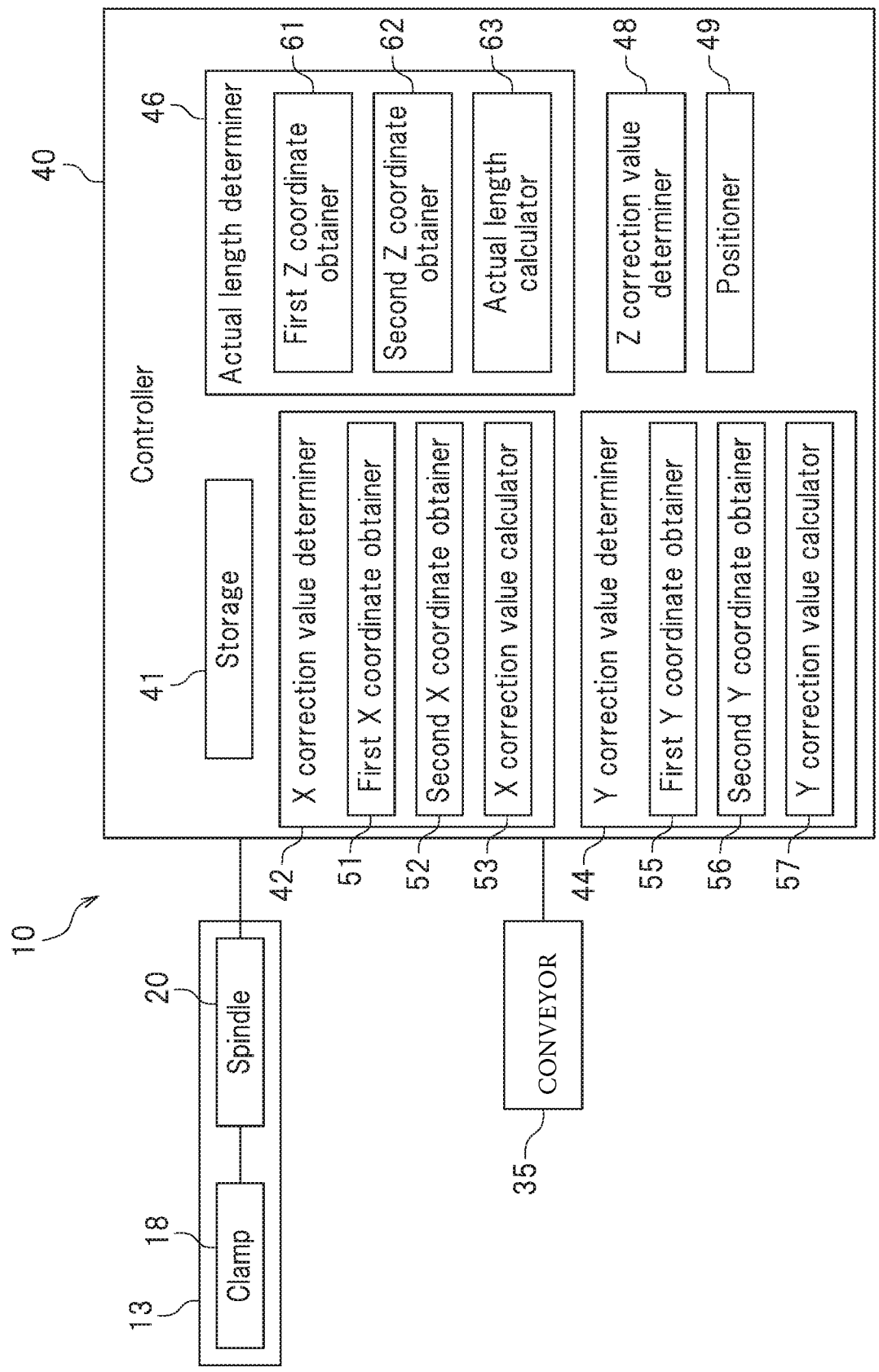
FIG. 2 is a block diagram showing the machining device.

FIG. 2 is a block diagram showing the machining device 10. As shown in FIG. 2, the controller 40 is connected communicably to the spindle 20 of the machining mechanism 13. The controller 40 controls the rotation of the spindle 20. The controller 40 is connected communicably to the conveyor 35. The controller 40 controls the conveyor 35 to control the movement of the clamp 18 relative to the support 16. With the machining mechanism 13 of the present preferred embodiment, when the detection tool 28, being clamped by the clamp 18, comes into contact with the correction jig 100, for example, an electrical conduction is detected. Upon detection of the electrical conduction, the controller 40 can obtain the coordinate values of the position of the correction jig 100 based on the position of the clamp 18 at the time of the detection.

In the present preferred embodiment, the controller 40 is configured or programmed to include a storage 41, an X correction value determiner 42, a Y correction value determiner 44, an actual length determiner 46, a Z correction value determiner 48, and a positioner 49. The X correction value determiner 42 includes a first X coordinate obtainer 51, a second X coordinate obtainer 52, and an X correction value calculator 53. The Y correction value determiner 44 includes a first Y coordinate obtainer 55, a second Y coordinate obtainer 56, and a Y correction value calculator 57. The actual length determiner 46 includes a first Z coordinate obtainer 61, a second Z coordinate obtainer 62, and an actual length calculator 63. These sections of the controller 40 may be implemented by software or by hardware. Note that the sections of the controller 40 will be described later in detail.

With the machining device 10, a positioning process of positioning components of the machining device 10 is performed at predetermined times, such as when shipped out of a factory and when replacing the components. In the positioning process, first, the detection tool 28 is clamped by the clamp 18. The detection tool 28 clamped by the clamp 18 is brought into contact with a pre-set measurement point (not shown), thus obtaining the coordinate values of the measurement point. Then, the positioning correction value used for performing the positioning process is calculated based on the coordinate values of the measurement point obtained by the detection tool 28 and the design coordinate values of the measurement point. Then, the components of the machining device 10 are positioned based on the positioning correction value.

Figure 3A:
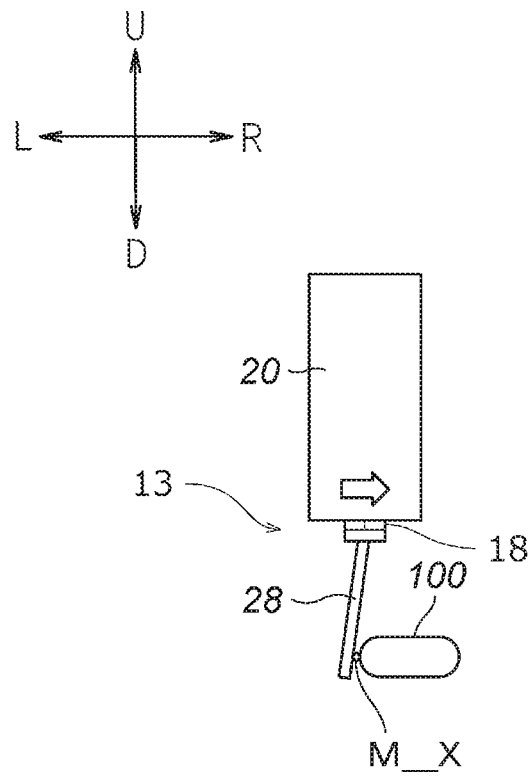
FIG. 3A is a diagram showing a detection tool clamped by the clamp being in contact with the X reference point, where the rotation angle of the detection tool is 0°.
Figure 3B:
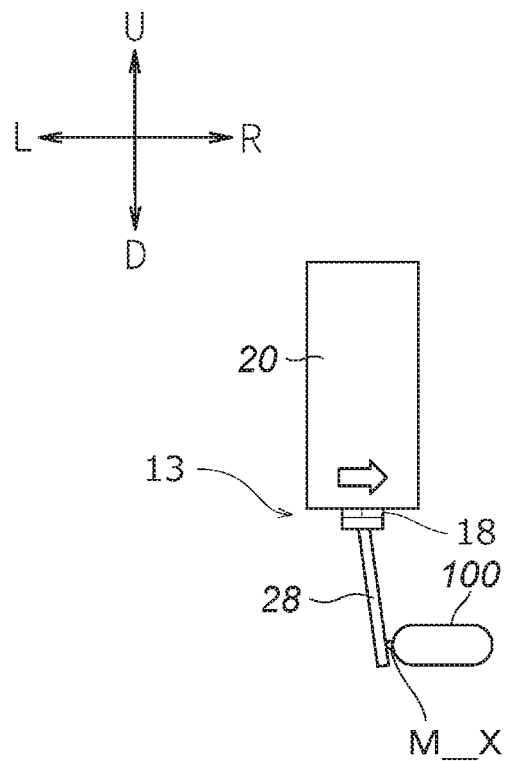
FIG. 3B is a diagram showing a detection tool clamped by the clamp being in contact with the X reference point, where the rotation angle of the detection tool is 180°.
Figure 4A:
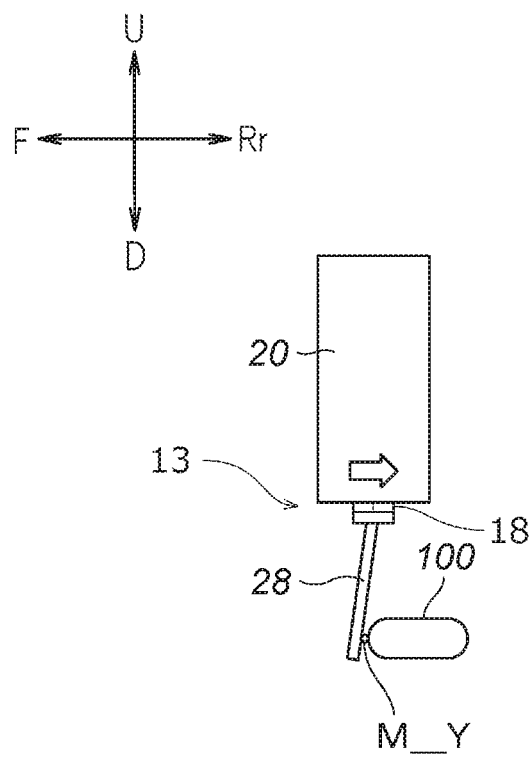
FIG. 4A is a diagram showing a detection tool clamped by the clamp being in contact with the Y reference point, where the rotation angle of the detection tool is 0°.
Figure 4B:
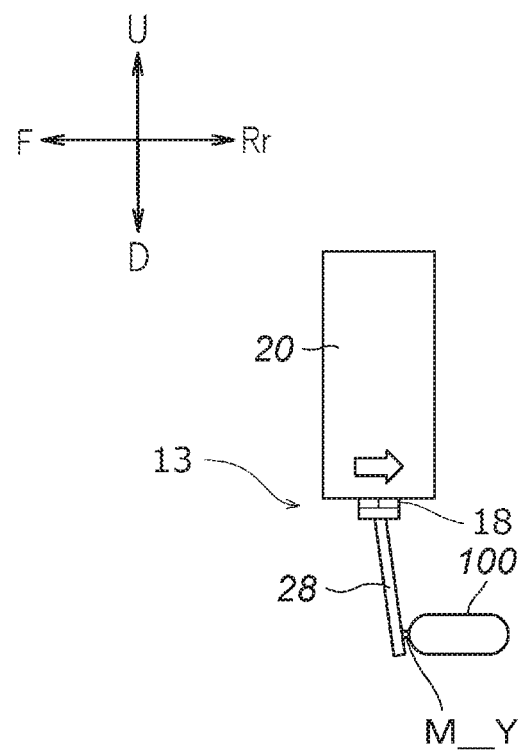
FIG. 4B is a diagram showing a detection tool clamped by the clamp being in contact with the Y reference point, where the rotation angle of the detection tool is 180°.
Figure 5A:
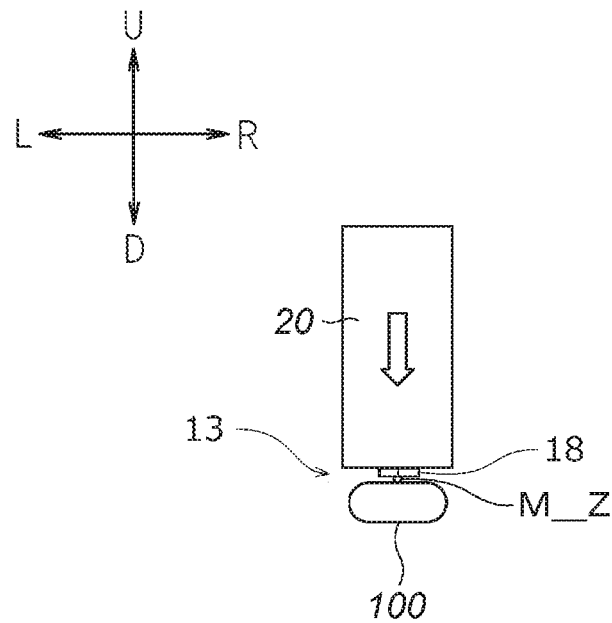
FIG. 5A is a diagram showing the clamp in contact with the Z reference point.
Figure 5B:
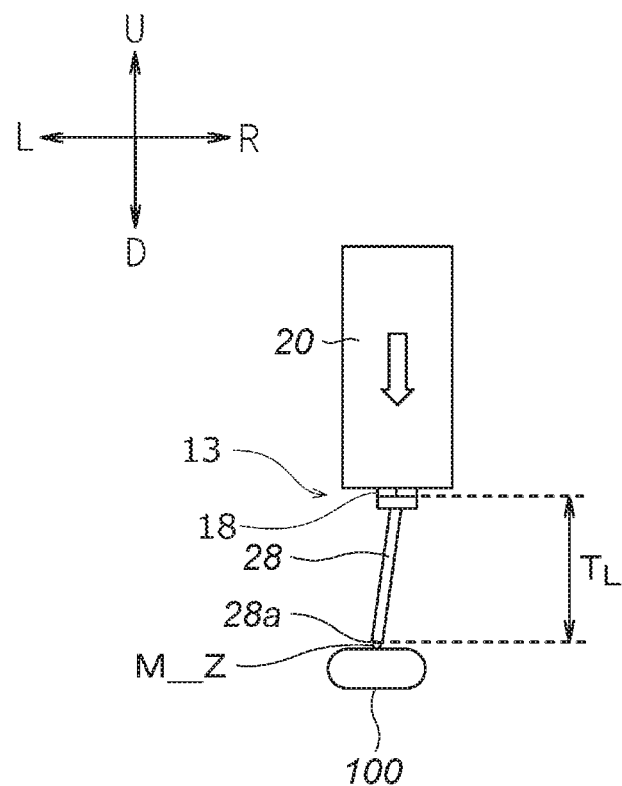
FIG. 5B is a diagram showing the detection tool clamped by the clamp being in contact with the Z reference point.

FIGS. 3A and 3B are diagrams each showing the detection tool 28 clamped by the clamp 18 being in contact with the X reference point M_X. FIGS. 4A and 4B are diagrams each showing the detection tool 28 clamped by the clamp 18 being in contact with the Y reference point M_Y. FIG. 3A and FIG. 4A show the detection tool 28, where the rotation angle of the detection tool 28 is 0°. FIG. 3B and FIG. 4B show the detection tool 28, where the rotation angle of the detection tool 28 is 180°. FIG. 5A is a diagram showing the clamp 18 in contact with the Z reference point M_Z. FIG. 5B is a diagram showing the detection tool 28 clamped by the clamp 18 being in contact with the Z reference point M_Z.

As shown in FIGS. 3A and 3B, the detection tool 28 may possibly be clamped by the clamp 18 in a slanted position. Therefore, by determining the positioning correction value while taking into consideration the slant correction value for correcting the slant of the detection tool 28, it is possible to more appropriately position the components of the machining device 10. The slant correction value is an example of the "correction value". The procedure for determining the slant correction value will now be described.

In the present preferred embodiment, the slant correction value includes the X correction value $S_{mx}$, the Y correction value $S_{my}$ and the Z correction value $S_{mz}$. The X correction value $S_{mx}$ is the slant correction value for the X-axis direction. The Y correction value $S_{my}$ is the slant correction value for the Y-axis direction. The Z correction value $S_{mz}$ is the slant correction value for the Z-axis direction. In the present preferred embodiment, the slant correction value is determined by determining the X correction value $S_{mx}$, the Y correction value $S_{my}$ and the Z correction value $S_{mz}$.

In the present preferred embodiment, the X reference point M_X (see FIG. 3A), the Y reference point M_Y (see FIG. 4A) and the Z reference point M_Z (see FIG. 5A) are used when determining the slant correction value. The X reference point M_X, the Y reference point M_Y and the Z reference point M_Z are pre-set on the surface of the correction jig 100. Note however that the X reference point M_X, the Y reference point M_Y and the Z reference point M_Z may be pre-set on the surface of a component, e.g., the support 16, of the machining device 10. The X reference point M_X shown in FIG. 3A is a point that is used when determining the X correction value $S_{mx}$, and is located at the end in the X-axis direction of the correction jig 100 supported on the support 16. The Y reference point M_Y shown in FIG. 4A is a point that is used when determining the Y correction value $S_{my}$, and is located at the end in the Y-axis direction of the correction jig 100 supported on the support 16. The Z reference point M_Z shown in FIG. 5A is a point that is used for measuring the actual length of the detection tool 28 clamped by the clamp 18, and is located at the end in the Z-axis direction of the correction jig 100 supported on the support 16. Herein, the Z reference point M_Z is located on the upper end of the correction jig 100.

With the machining device 10 of the present preferred embodiment, an electrical conduction is detected when the detection tool 28 clamped by the clamp 18 comes into contact with the X reference point M_X, the Y reference point M_Y and the Z reference point M_Z. The coordinate values of the detection tool based on the position of the clamp 18 upon detecting the electrical conduction are used as the coordinate values of the X reference point M_X, the Y reference point M_Y and the Z reference point M_Z.

The control operations for determining the X correction value $S_{mx}$, the Y correction value $S_{my}$ and the Z correction value $S_{mx}$ will now be described in this order. In the present preferred embodiment, the X correction value determiner 42 determines the X correction value $S_{mx}$ based on the X coordinate value when the detection tool 28 clamped by the clamp 18 is brought into contact with the X reference point M_X. The X correction value $S_{mx}$ is determined by the first X coordinate obtainer 51, the second X coordinate obtainer 52 and the X correction value calculator 53.

Specifically, the first X coordinate obtainer 51 obtains, as the first X coordinate value M_X1·x, the X coordinate value when the detection tool 28 clamped by the clamp 18 is brought into contact with the X reference point M_X, with the rotation angle of the spindle 20, i.e., the rotation angle of the detection tool 28 clamped by the clamp 18, being 0°, as shown in FIG. 3A. Herein, the first X coordinate obtainer 51 controls the conveyor 35 so that the clamp 18 is located at such a height that the X reference point M_X is in contact with a predetermined portion of the detection tool 28, with the rotation angle of the spindle 20 being 0°. The first X coordinate obtainer 51 controls the conveyor 35 so that the detection tool 28 moves along a straight line that passes through the X reference point M_X and is parallel to the X axis. Then, the first X coordinate obtainer 51 obtains, as the first X coordinate value M_X1·x, the X coordinate value of the detection tool 28 when the detection tool 28 clamped by the clamp 18 and the X reference point M_X come into contact with each other.

Then, the second X coordinate obtainer 52 obtains, as the second X coordinate value M_X1(180)·x, the X coordinate value of the detection tool 28 when the detection tool 28 clamped by the clamp 18 is brought into contact with the X reference point M_X, with the rotation angle of the spindle 20 being 180°, as shown in FIG. 3B.

The X correction value calculator 53 calculates the X correction value $S_{mx}$ based on the first X coordinate value M_X1·x obtained by the first X coordinate obtainer 51 and the second X coordinate value M_X1(100)·x obtained by the second X coordinate obtainer 52. In the present preferred embodiment, the X correction value calculator 53 calculates the X correction value $S_{mx}$ using Expression (1) below.

$$S_{mx}=(M\_X1 \cdot x - M\_X1(180) \cdot x)/2 \qquad (1)$$

In the present preferred embodiment, the Y correction value determiner 44 determines the Y correction value $S_{my}$ based on the Y coordinate value when the detection tool 28 clamped by the clamp 18 is brought into contact with the Y reference point M_Y. The Y correction value $S_{my}$ is determined by the first Y coordinate obtainer 55, the second Y coordinate obtainer 56 and the Y correction value calculator 57.

Specifically, the first Y coordinate obtainer 55 obtains, as the first Y coordinate value M_Y1·y, the Y coordinate value when the detection tool 28 clamped by the clamp 18 is brought into contact with the Y reference point M_Y, with the rotation angle of the spindle 20, i.e., the rotation angle of the detection tool 28 clamped by the clamp 18, being 0°, as shown in FIG. 4A. Herein, the first Y coordinate obtainer 55 controls the conveyor 35 so that the clamp 18 is located at such a height that the Y reference point M_Y is in contact with a predetermined portion of the detection tool 28, with the rotation angle of the spindle 20 being 0°. The first Y coordinate obtainer 55 controls the conveyor 35 so that the detection tool 28 moves along a straight line that passes through the Y reference point M_Y and is parallel to the Y axis. Then, the first Y coordinate obtainer 55 obtains, as the first Y coordinate value M_Y1·y, the Y coordinate value of the detection tool 28 when the detection tool 28 clamped by the clamp 18 and the Y reference point M_Y come into contact with each other.

Then, the second Y coordinate obtainer 56 obtains, as the second Y coordinate value M_Y1(180)·y, the Y coordinate value of the detection tool 28 when the detection tool 28 clamped by the clamp 18 is brought into contact with the Y reference point M_Y, with the rotation angle of the spindle 20 being 180°, as shown in FIG. 4B.

The Y correction value calculator 57 calculates the Y correction value $S_{my}$ based on the first Y coordinate value M_Y1·y obtained by the first Y coordinate obtainer 55 and the second Y coordinate value M_Y1(180)·y obtained by the second Y coordinate obtainer 56. In the present preferred embodiment, the Y correction value calculator 57 calculates the Y correction value $S_{my}$ using Expression (2) below.

$$S_{my}=(M\_Y1 \cdot y - M\_Y1(180) \cdot y)/2 \qquad (2)$$

In the present preferred embodiment, in order to determine the Z correction value $S_{mz}$, the actual length $T_L$ of the detection tool 28 clamped by the clamp 18 (hereinafter, referred to as the actual length $T_L$) is determined first. Herein, as shown in FIG. 5B, the actual length $T_L$ is the actual length of the detection tool 28 clamped by the clamp 18 along the Z-axis direction, and is the length of the detection tool 28 along the Z-axis direction protruding downward from the clamp 18. The actual length determiner 46 determines the actual length $T_L$ of the detection tool 28 clamped by the clamp 18. The actual length $T_L$ of the detection tool 28 is determined by the first Z coordinate obtainer 61, the second Z coordinate obtainer 62 and the actual length calculator 63.

Specifically, the first Z coordinate obtainer 61 obtains, as the first Z coordinate value M_Z1, the Z coordinate value when the clamp 18 that is not clamping the machining tool 26 or the detection tool 28, i.e., the clamp 18 is clamping nothing, is brought into contact with the Z reference point M_Z, as shown in FIG. 5A. Herein, the first Z coordinate obtainer 61 controls the conveyor 35 so that the spindle 20 and the clamp 18 are located above the Z reference point M_Z. The first Z coordinate obtainer 61 controls the conveyor 35 so that the clamp 18 moves along a straight line that passes the Z reference point M_Z and is parallel to the Z axis. The first Z coordinate obtainer 61 obtains, as the first Z coordinate value M_Z1, the Z coordinate value of the clamp 18 when the lower end of the clamp 18 and the Z reference point M_Z come into contact with each other.

Next, the second Z coordinate obtainer 62 obtains, as the second Z coordinate value M_Z2, the Z coordinate value of the detection tool 28 when the detection tool 28 clamped by the clamp 18 is brought into contact with the Z reference point M_Z, as shown in FIG. 5B. Note that there is no particular limitation on the rotation angle of the spindle 20, and it may be 0° or may be 180°.

The actual length calculator 63 calculates the actual length $T_L$ of the detection tool 28 based on the first Z coordinate value M_Z1 obtained by the first Z coordinate obtainer 61 and the second Z coordinate value M_Z2 obtained by the second Z coordinate obtainer 62. In the present preferred embodiment, the actual length calculator 63 calculates the actual length $T_L$ of the detection tool 28 using Expression (3) below.

$$T_L = M\_Z2 - M\_Z1 \qquad (3)$$

Figure 6A:
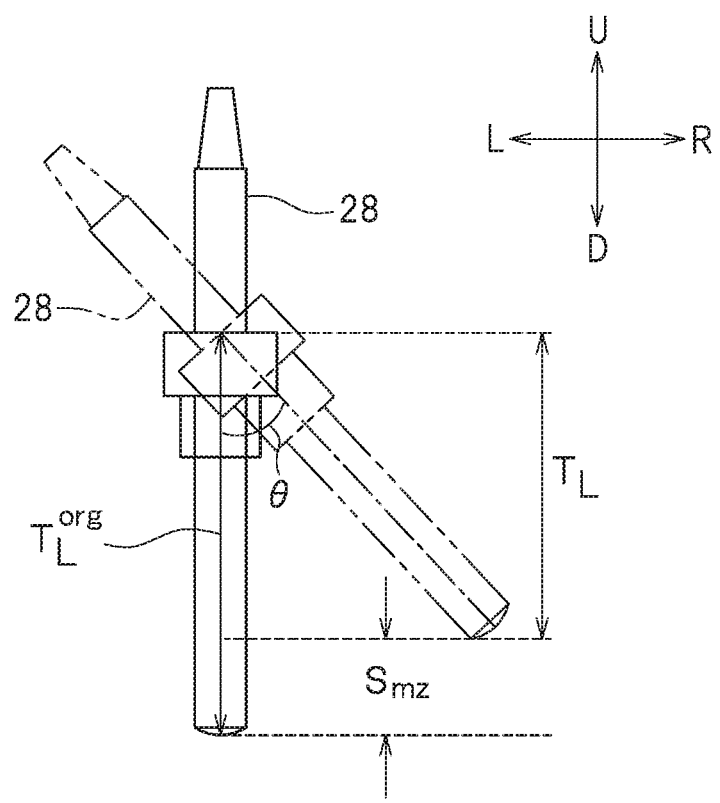
FIG. 6A is a diagram showing the relationship between the actual length and the design length of the detection tool.
Figure 6B:
FIG. 6B is a conceptual diagram showing the relationship between the X correction value and the Y correction value.

After the actual length $T_L$ of the detection tool 28 clamped by the clamp 18 is calculated as described above, the Z correction value determiner 48 determines the Z correction value $S_{mz}$ based on the X correction value $S_{mx}$, the Y correction value $S_{my}$, the actual length $T_L$ of the detection tool 28 and the design length $T_L^{org}$ of the detection tool 28. FIG. 6A is a diagram showing the relationship between the actual length $T_L$ and the design length $T_L^{org}$ of the detection tool 28. In FIG. 6A, the solid-line detection tool 28 is in a non-slanted position, and the phantom-line detection tool 28 is in a slanted position. FIG. 6B is a conceptual diagram showing the relationship between the X correction value $S_{mz}$ and the Y correction value $S_{my}$. Herein, as shown in FIG. 6A, the design length $T_L^{org}$ of the detection tool 28 is the design length of the detection tool 28 in the direction along the central axis of the detection tool 28. The design length $T_L^{org}$ of the detection tool 28 is pre-stored in the storage 41. In the present preferred embodiment, the Z correction value determiner 48 calculates the Z correction value $S_{mz}$ using Expression (4) below.

where $$S_{mz} = T_L^{org} - T_L^{org} \cos\theta,$$

$$= T_L^{org}(1-\cos\theta) \qquad (4)$$

$$\therefore D_z = ((S_{mx})^2 + (S_{my})^2)^{1/2},$$

$$T_L \tan\theta = D_z \qquad (5)$$

$$\theta = \tan^{-1}(D_z/T_L) \text{ [rad]} \qquad (6)$$

Note that the variable θ of Expression (4) above is calculated as shown in Expression (5) and Expression (6) above using the X correction value $S_{mx}$, the Y correction value $S_{my}$ and the actual length $T_L$ of the detection tool 28. Note that in Expression (4) above, $D_z$, the X correction value $S_{mx}$ and the Y correction value $S_{my}$ can be expressed as shown in FIG. 6B.

The positioner 49 controls the conveyor 35 so that the machining mechanism 13 moves while the detection tool 28 is clamped by the clamp 18. Then, the detection tool 28 clamped by the clamp 18 is brought into contact with a predetermined measurement point (not shown). The predetermined measurement point is a pre-set point on the surface of the correction jig 100, for example. The positioner 49 obtains coordinate values (specifically, the X coordinate value, the Y coordinate value and the Z coordinate value) when the detection tool 28 comes into contact with the measurement point. Then, a measurement point taking the slant correction value into consideration is calculated by adding the X correction value $S_{mx}$, the Y correction value $S_{my}$ and the Z correction value $S_{mz}$ to the X coordinate value, the Y coordinate value and the Z coordinate value, respectively, of the measurement point. Herein, the measurement point taking the slant correction value into consideration is referred to as the corrected measurement point.

In the present preferred embodiment, the design coordinate values (specifically, the X coordinate value, the Y coordinate value and the Z coordinate value) of the predetermined measurement point are stored in the storage 41. The positioner 49 calculates the positioning correction value based on the coordinate values of the corrected measurement point and the design coordinate values of the predetermined measurement point stored in the storage 41. Then, the positioner 49 performs the positioning process of positioning the components of the machining device 10 based on the positioning correction value. Note that the specific calculation method for calculating the positioning correction value and the method for performing the positioning process of positioning the components of the machining device 10 using the positioning correction value may be those of conventional techniques known in the art. Therefore, the calculation method for calculating the positioning correction value and the method for performing the positioning process will not be described below.

The configuration of the machining device 10 of the present preferred embodiment has been described above. Next, a control procedure for calculating the slant correction value, i.e., the X correction value $S_{mx}$, the Y correction value $S_{my}$ and the Z correction value $S_{mx}$, will be briefly described with reference to the flow chart of FIG. 7. Herein, a control for calculating the slant correction value is started with the detection tool 28 or the machining tool 26 being not clamped by the clamp 18 of the machining device 10 and with the correction jig 100 being supported on the support 16.

Figure 7:
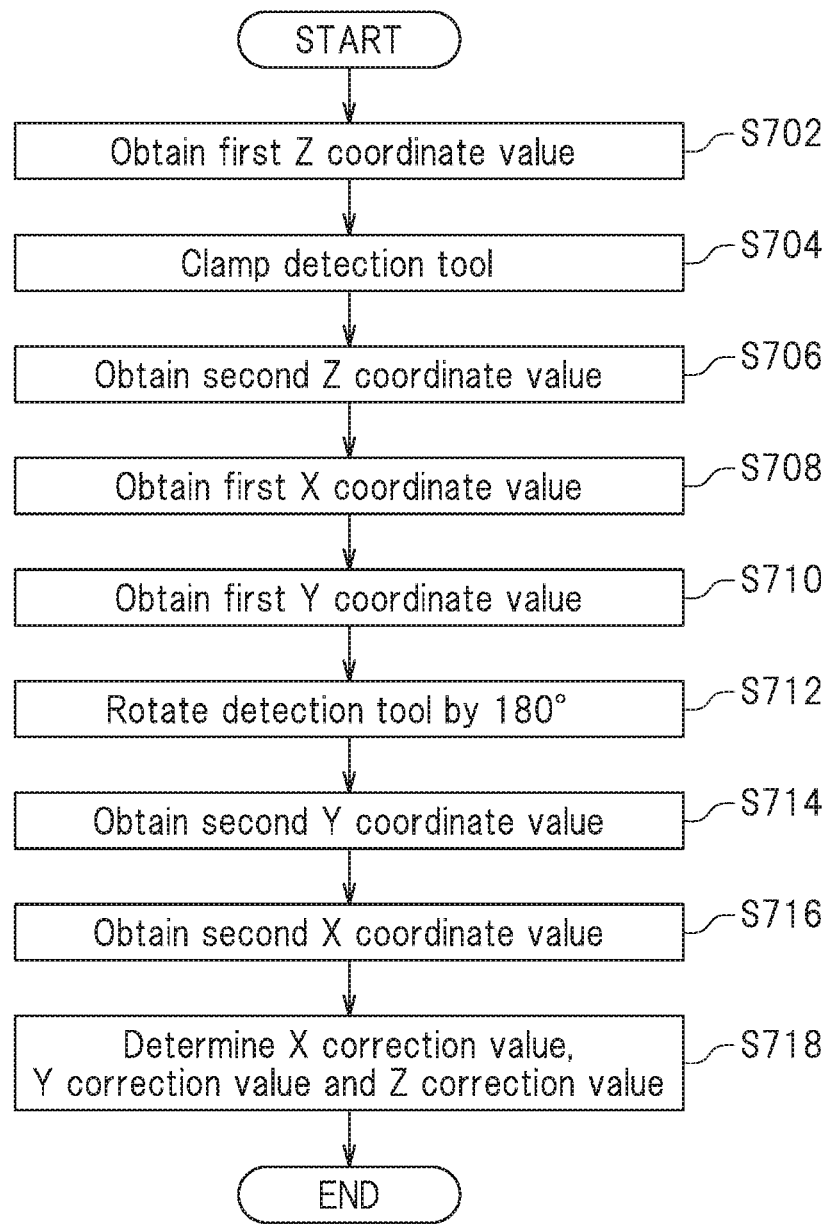
FIG. 7 is a flow chart showing a procedure for calculating the slant correction value.

First, in step S702 of FIG. 7, the first Z coordinate obtainer 61 controls the conveyor 35 so as to bring the clamp 18 (specifically, the lower end of the clamp 18) into contact with the Z reference point M_Z of the correction jig 100 in the Z-axis direction, as shown in FIG. 5A. Then, the first Z coordinate obtainer 61 obtains, as the first Z coordinate value M_Z1, the Z coordinate value when the clamp 18 comes into contact with the Z reference point M_Z.

Next, in step S704, the controller 40 performs a control so that the clamp 18 clamps the detection tool 28. Note that in step S704, the rotation angle of the detection tool 28 (in other words, the spindle 20) when the clamp 18 clamps the detection tool 28 is assumed to be 0°. Next, in step S706, the second Z coordinate obtainer 62 controls the conveyor 35 so as to bring the detection tool 28 clamped by the clamp 18 into contact with the Z reference point M_Z in the Z-axis direction, as shown in FIG. 5B. Then, the second Z coordinate obtainer 62 obtains, as the second Z coordinate value M_Z2, the Z coordinate value when the detection tool 28 comes into contact with the Z reference point M_Z.

Next, in step S708, the first X coordinate obtainer 51 controls the conveyor 35 so as to bring the detection tool 28 clamped by the clamp 18 into contact with the X reference point M_X of the correction jig 100 in the X-axis direction, as shown in FIG. 3A. Then, the first X coordinate obtainer 51 obtains, as the first X coordinate value M_X1·x, the X coordinate value when the detection tool 28 comes into contact with the X reference point M_X.

Next, in step S710, the first Y coordinate obtainer 55 controls the conveyor 35 so as to bring the detection tool 28 clamped by the clamp 18 into contact with the Y reference point M_Y of the correction jig 100 in the Y-axis direction, as shown in FIG. 4A. Then, the first Y coordinate obtainer 55 obtains, as the first Y coordinate value M_Y1·y, the Y coordinate value when the detection tool 28 comes into contact with the Y reference point M_Y.

In step S712, the controller 40 rotates the spindle 20 by 180° so that the rotation angle of the detection tool 28 clamped by the clamp 18 becomes 180°. Next, in step S714, the second Y coordinate obtainer 56 controls the conveyor 35 so as to bring the detection tool 28 clamped by the clamp 18 into contact with the Y reference point M_Y in the Y-axis direction, as shown in FIG. 4B. Then, the second Y coordinate obtainer 56 obtains, as the second Y coordinate value M_Y1(180)·y, the Y coordinate value when the detection tool 28 comes into contact with the Y reference point M_Y.

Next, in step S716, the second X coordinate obtainer 52 controls the conveyor 35 so as to bring the detection tool 28 clamped by the clamp 18 into contact with the X reference point M_X in the X-axis direction, as shown in FIG. 3B.

Then, the second X coordinate obtainer 52 obtains, as the second X coordinate value M_X1(180)·x, the X coordinate value when the detection tool 28 comes into contact with the X reference point M_X.

Next, in step S718, the X correction value $S_{mx}$, the Y correction value $S_{my}$ and the Z correction value $S_{mz}$ are determined. In the present preferred embodiment, the X correction value calculator 53 calculates the X correction value $S_{mx}$ using Expression (1) above based on the first X coordinate value M_X1·x and the second X coordinate value M_X1(180)·x. The Y correction value calculator 57 calculates the Y correction value $S_{my}$ using Expression (2) above based on the first Y coordinate value M_Y1·y and the second Y coordinate value M_Y1(180)·y. When determining the Z correction value $S_{mz}$, first, the actual length calculator 63 calculates the actual length $T_L$ of the detection tool 28 using Expression (3) above based on the first Z coordinate value M_Z1 and the second Z coordinate value M_Z2. Then, the Z correction value determiner 48 calculates and determines the Z correction value $S_{mz}$ using Expression (4) above based on the X correction value $S_{mx}$, the Y correction value $S_{my}$, the actual length $T_L$ of the detection tool 28 and the design length $T_L^{org}$ of the detection tool 28. The slant correction value can be determined as described above.

Figure 8:
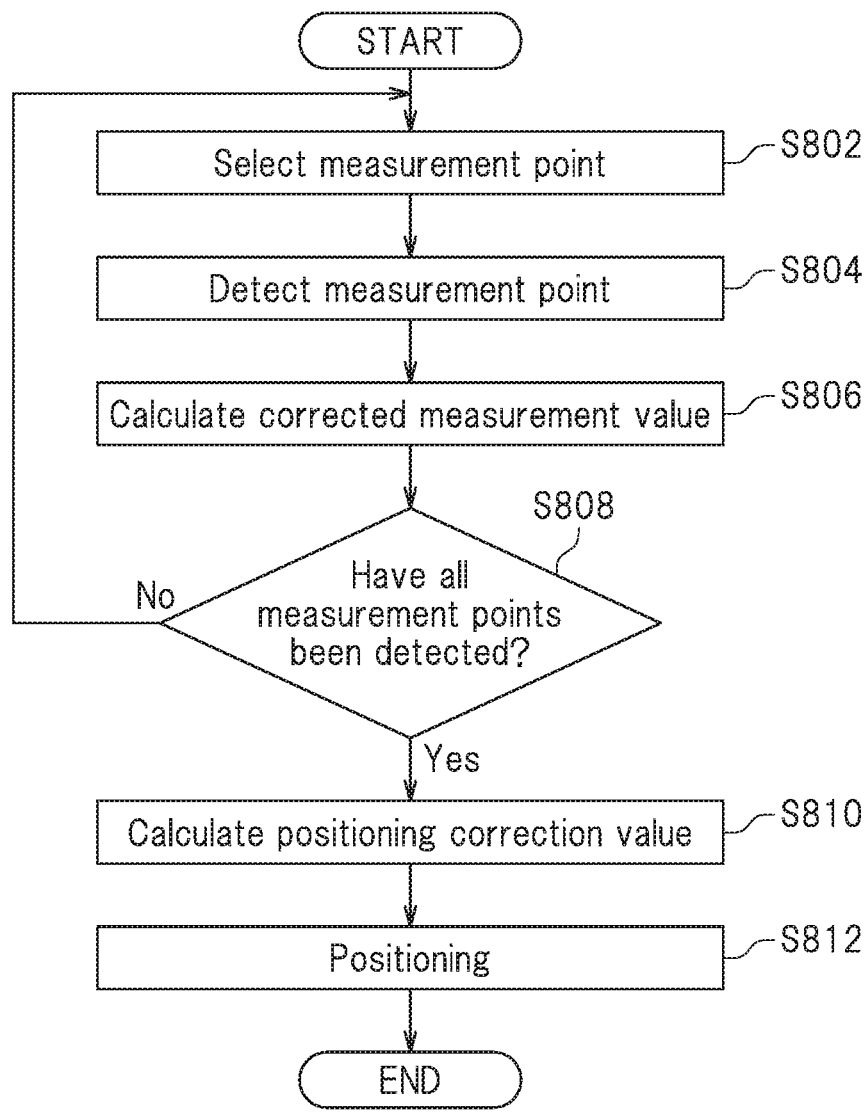
FIG. 8 is a flow chart showing a procedure of the positioning process.

Next, a control procedure for performing the positioning process of positioning the components of the machining device 10 will be described with reference to the flow chart of FIG. 8. During the positioning process, the detection tool 28 is clamped by the clamp 18, and the correction jig 100 is supported on the support 16. Note that although not shown in detail in the figures, a plurality of measurement points are pre-set on the surface of the correction jig 100. In the positioning process, the plurality of measurement points are detected by the detection tool 28.

First, in step S802, the positioner 49 selects one of the plurality of measurement points that has not been detected. In step S804, the positioner 49 controls the conveyor 35 so as to bring the detection tool 28 clamped by the clamp 18 into contact with the measurement point selected in step S802. In this process, the positioner 49 obtains the X coordinate value of the measurement point by bringing the detection tool 28 into contact with the measurement point in the X-axis direction. Similarly, the positioner 49 obtains the Y coordinate value of the measurement point by bringing the detection tool 28 into contact with the measurement point in the Y-axis direction. The positioner 49 obtains the Z coordinate value of the measurement point by bringing the detection tool 28 into contact with the measurement point in the Z-axis direction.

Next, in step S806, the positioner 49 adds the X correction value $S_{mx}$, the Y correction value $S_{my}$ and the Z correction value $S_{mx}$ to the X coordinate value, the Y coordinate value and the Z coordinate value, respectively, of the measurement point, thus calculating the corrected measurement point taking the slant correction value into consideration.

Next, in step S808, the positioner 49 determines whether or not all of the pre-set measurement points on the correction jig 100 have been detected. Herein, if there is a measurement point that has not been detected, the determination result is No, and the process of step S802 is performed again. On the other hand, if all of the measurement points have been detected, the determination result is Yes, and the process next proceeds to step S810.

In step S810, the positioner 49 calculates the positioning correction value based on the corrected measurement point calculated in step S806. Note that since the positioning correction value can be calculated by conventional methods known in the art, and the calculation will therefore not be described below.

After the positioning correction value is calculated in step S810, in step S812, the positioner 49 determines the positions of the components of the machining device 10 based on the positioning correction value calculated in step S810. The positioning of the components can be done by conventional methods known in the art, and the positioning will therefore not be described below. The positioning process of positioning the components of the machining device 10 can be performed as described above.

Figure 9A:
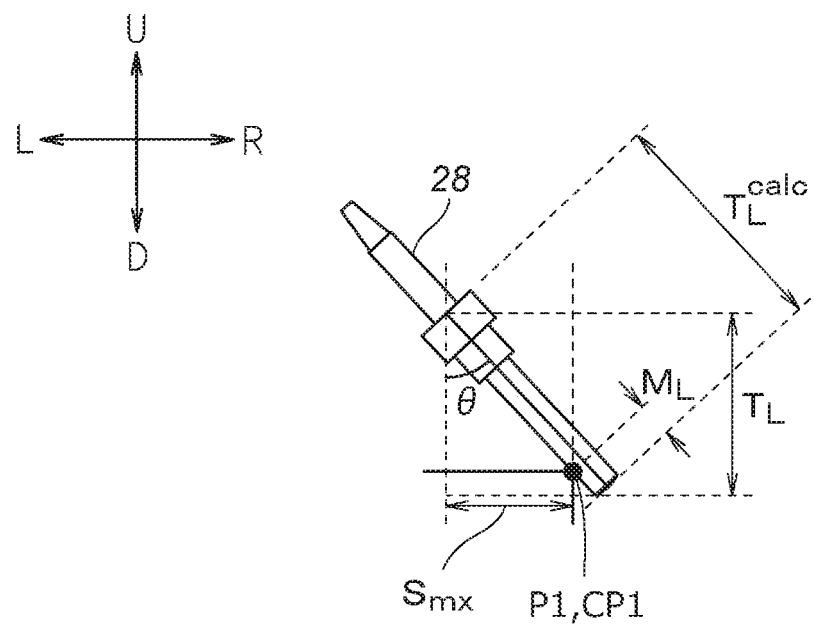
FIG. 9A is a diagram showing the detection tool in contact with the first measurement point.
Figure 9B:
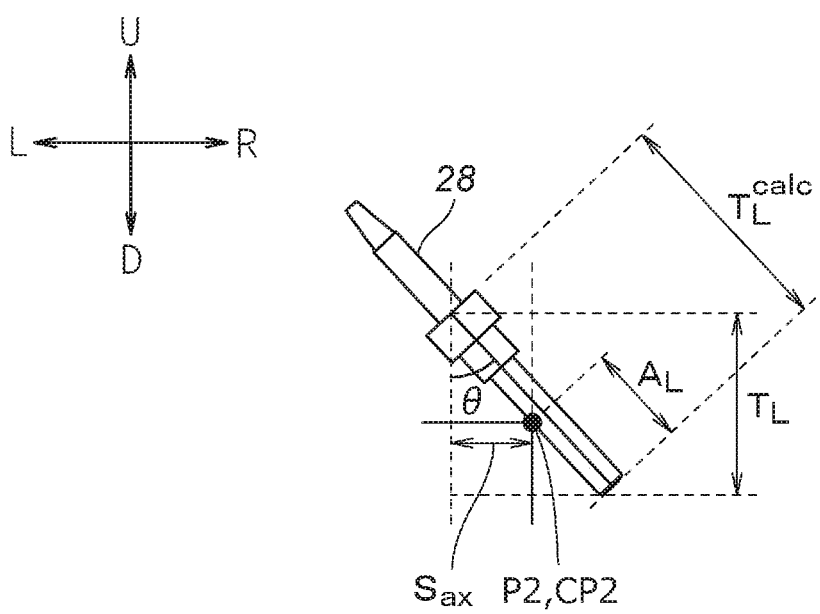
FIG. 9B is a diagram showing the detection tool in contact with the second measurement point.
Figure 10A:
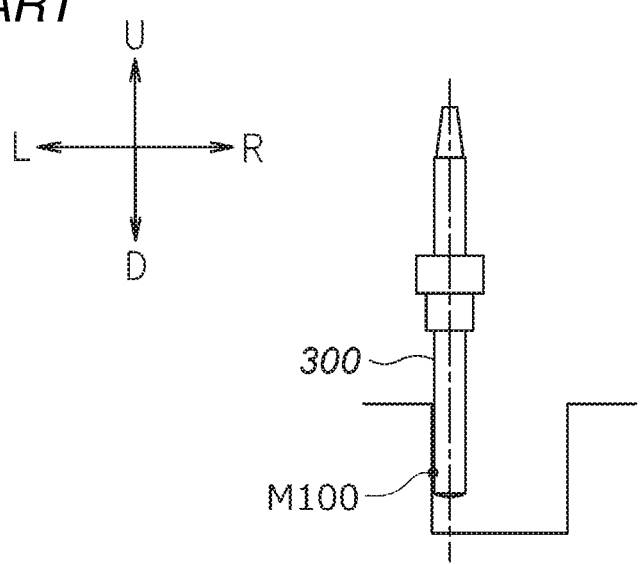
FIG. 10A is a diagram showing the detection tool in a non-slanted position according to a conventional technique.
Figure 10B:
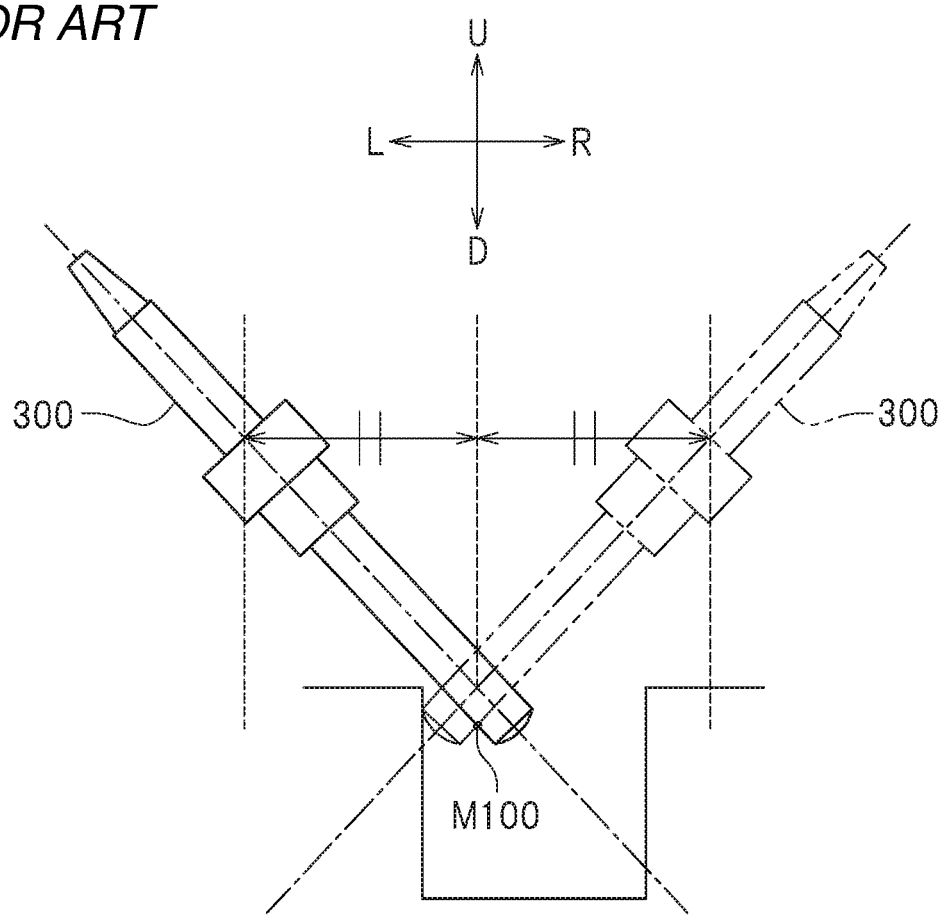
FIG. 10B is a diagram showing the detection tool in a slanted position according to the conventional technique.

FIG. 9A is a diagram showing the detection tool 28 clamped by the clamp 18 in contact with the first measurement point P1. FIG. 9B is a diagram showing the detection tool 28 clamped by the clamp 18 in contact with the second measurement point P2. For example, the correction jig 100 has the first measurement point P1 (see FIG. 9A) and the second measurement point P2 (see FIG. 9B) thereon, for example. Herein, although not shown in the figures, the Z coordinate value of the first measurement point P1 is the same as the Z coordinate value of the X reference point M_X and the Z coordinate value of the Y reference point M_Y. The Z coordinate value of the second measurement point P2 is different from the Z coordinate value of the X reference point M_X and the Z coordinate value of the Y reference point M_Y. A point on the detection tool 28 clamped by the clamp 18 that is in contact with the first measurement point P1 is the contact point CP1, as shown in FIG. 9A. A point on the detection tool 28 clamped by the clamp 18 that is in contact with the second measurement point P2 is the contact point CP2, as shown in FIG. 9B. In the present preferred embodiment, when calculating the corrected measurement point for the first measurement point P1 of which the Z coordinate value is the same as the X reference point M_X, it is possible to obtain a more accurate corrected measurement point by using the X correction value $S_{mx}$, the Y correction value $S_{my}$ and the Z correction value $S_{mx}$. However, when calculating the corrected measurement point for the second measurement point P2 of which the Z coordinate value is different from the X reference point M_X, the corrected measurement point may have an error if the X correction value $S_{mx}$, the Y correction value $S_{my}$ and the Z correction value $S_{mx}$ are used. When calculating the corrected measurement point of such a second measurement point P2, it is desirable to use another X correction value $S_{ax}$, another Y correction value $S_{ay}$ and another Z correction value $S_{ax}$ that are calculated as follows.

The X correction value determiner 42 determines the other X correction value $S_{ax}$ based on the X correction value $S_{mx}$ obtained from the X reference point M_X. Specifically, where k denotes a predetermined coefficient, the X correction value determiner 42 can calculate the other X correction value $S_{ax}$ by multiplying together the predetermined coefficient k and the X correction value $S_{mx}$ as shown in Expression (7) below.

$$S_{ax} = k \times S_{mx} \quad (7)$$

The Y correction value determiner 44 determines the other Y correction value $S_{ay}$ based on the Y correction value $S_{my}$ obtained from the Y reference point M_Y. Specifically, the Y correction value determiner 44 can calculate the other Y correction value $S_{ay}$ by multiplying the predetermined coefficient k and the Y correction value $S_{my}$ as shown in Expression (8) below.

$$S_{ay} = k \times S_{my} \quad (8)$$

Note that in the present preferred embodiment, the contact design length $M_L$ (see FIG. 9A) and another contact design length $A_L$ (see FIG. 9B) are pre-stored in the storage 41. As shown in FIG. 9A, the contact design length $M_L$ is the design length from the tip of the detection tool 28 clamped by the clamp 18 to the contact point CP1 of the detection tool 28 to be in contact with the first measurement point P1. As shown in FIG. 9B, the other contact design length $A_L$ is the design length from the tip of the detection tool 28 clamped by the clamp 18 to the other contact point CP2 of the detection tool 28 to be in contact with the second measurement point P2.

In the present preferred embodiment, the predetermined coefficient k can be calculated by Expression (9) below.

$$k = (T_L^{calc} - A_L)/(T_L^{calc} - M_L) \quad (9)$$

where $T_L^{calc} = T_L / \cos\theta$.

The Z correction value determiner 48 determines the other Z correction value $S_a z$ by replacing $S_{mx}$, $S_{my}$ and $S_{mx}$ with $S_{ax}$, $S_{ay}$ and $S_{ax}$, respectively, in Expression (4) to Expression (6) above based on the other X correction value $S_{ax}$ and the other Y correction value $S_{ay}$.

In the present preferred embodiment, when the positioner calculates the corrected measurement point for the first measurement point P1, it is desirable to use the X correction value $S_{mx}$, the Y correction value $S_{my}$ and the Z correction value $S_{mx}$. When the positioner 49 calculates the corrected measurement point for the second measurement point P2, it is desirable to use the other X correction value $S_{ax}$, the other Y correction value $S_{ay}$ and the other Z correction value $S_{ax}$. Thus, even with the measurement points P1 and P2 having different Z coordinate values, it is possible to calculate a more precise corrected measurement point. Therefore, it is possible to perform a more precise positioning process.

As described above, in the present preferred embodiment, the Z correction value $S_{mx}$ is determined based not only on the X correction value $S_{mx}$ and the Y correction value $S_{my}$, but on the X correction value $S_{mx}$, the Y correction value $S_{my}$, the actual length $T_L$ of the detection tool 28 and the design length $T_L^{org}$ of the detection tool 28. Therefore, the X coordinate value, the Y coordinate value and the Z coordinate value of the slant measurement value for positioning are corrected based on the X correction value $S_{mx}$, the Y correction value $S_{my}$ and the Z correction value $S_{mz}$, respectively. Therefore, the Z coordinate value is also corrected, as well as the X coordinate value and the Y coordinate value of the measurement value, with the slant correction value. Thus, by performing the positioning process of positioning the components of the machining device 10 using the corrected measurement point whose measured values have been corrected, it is possible to perform a precise positioning process.

In the present preferred embodiment, the components of the machining device 10 include the magazine 30, for example. By performing the positioning process of positioning the magazine 30 using such a corrected measurement point as described above, the machining tool 26 accommodated in the magazine 30 is unlikely to be clamped by the clamp 18 in a slanted position. Thus, since the machining tool 26 clamped by the clamp 18 is unlikely to be slanted, the machining precision improves. Also, the machining tool 26 clamped by the clamp 18 can be precisely accommodated in the magazine 30.

In the present preferred embodiment, the Z correction value determiner 48 determines the Z correction value $S_{mz}$ using Expression (4) above. Thus, by using Expression (4) above, it is possible to calculate the Z correction value $S_{mz}$ based on the X correction value $S_{mx}$, the Y correction value $S_{my}$, the actual length $T_L$ of the detection tool 28 and the design length $T_L^{org}$ of the detection tool 28. Thus, it is easy to calculate the Z correction value $S_{mz}$.

In the present preferred embodiment, the X correction value $S_{mx}$ is calculated using Expression (1) above based on the first X coordinate value M_X1·x obtained when the detection tool 28 whose rotation angle is 0° is brought into contact with the X reference point M_X (see FIG. 3A), and the second X coordinate value M_X1(180)·x obtained when the detection tool 28 whose rotation angle is 180° is brought into contact with the X reference point M_X (see FIG. 3B). Thus, even when the X reference point M_X is detected by the detection tool 28 in a slanted position, the X correction value $S_{mx}$ is calculated from the two X coordinate values M_X1·x and M_X1(180)·x. Therefore, it is possible to calculate a more accurate X correction value $S_{mx}$.

In the present preferred embodiment, the Y correction value $S_{my}$ is calculated using Expression (2) above based on the first Y coordinate value M_Y1·y obtained when the detection tool 28 whose rotation angle is 0° is brought into contact with the Y reference point M_Y (see FIG. 4A), and the second Y coordinate value M_Y1(180)·y obtained when the detection tool 28 whose rotation angle is 180° is brought into contact with the Y reference point M_Y (see FIG. 4B). Thus, even when the Y reference point M_Y is detected by the detection tool 28 in a slanted position, the Y correction value $S_{my}$ is calculated from the two Y coordinate values M_Y1·y and M_Y1(180)·y, and it is therefore possible to calculate a more accurate Y correction value $S_{my}$.

In the present preferred embodiment, the actual length $T_L$ of the detection tool 28 is determined based on the first Z coordinate value M_Z1 obtained when the clamp 18 is brought into contact with the Z reference point M_Z (see FIG. 5A) and the second Z coordinate value M_Z2 obtained when the detection tool 28 clamped by the clamp 18 is brought into contact with the Z reference point M_Z (see FIG. 5B). Thus, by detecting two Z coordinate values M_Z1 and M_Z2, it is possible to easily determine the actual length $T_L$.

Note that a preferred embodiment of the present invention provides a correction value determination method for determining the slant correction value. The correction value determination method includes an X correction value determining step, a Y correction value determination step, an actual length determination step and a Z correction value determination step, for example. The X correction value determining step, the Y correction value determination step, the actual length determination step and the Z correction value determination step are implemented by the X correction value determiner 42, the Y correction value determiner 44, the actual length determiner 46 and the Z correction value determiner 48, respectively.

The X correction value determining step includes a first X coordinate obtaining step, a second X coordinate obtaining step and an X correction value calculating step. The first X coordinate obtaining step, the second X coordinate obtaining step and the X correction value calculating step are implemented by the first X coordinate obtainer 51, the second X coordinate obtainer 52 and the X correction value calculator 53, respectively. The Y correction value determination step includes a first Y coordinate obtaining step, a second Y coordinate obtaining step and a Y correction value calculation step. The first Y coordinate obtaining step, the second Y coordinate obtaining step and the Y correction value calculation step are implemented by the first Y coordinate obtainer 55, the second Y coordinate obtainer 56 and the Y correction value calculator 57, respectively. The actual length determination step includes a first Z coordinate obtaining step, a second Z coordinate obtaining step and an actual length calculation step. The first Z coordinate obtaining step, the second Z coordinate obtaining step and the actual length calculation step are implemented by the first Z coordinate obtainer 61, the second Z coordinate obtainer 62 and the actual length calculator 63, respectively.

In the preferred embodiment described above, when the Z correction value $S_{mz}$ is large, for example, it is possible that the spindle 20 is slanted. Therefore, for example, the controller 40 includes a determiner that determines whether or not the Z correction value $S_{mz}$ is greater than a predetermined determination value, and an error notifier that gives an error notification when it is determined by the determiner that the Z correction value $S_{mz}$ is greater than the predetermined determination value. The predetermined determination value is a value based on which it is presumed that the spindle 20 is slanted, and is pre-stored in the storage 41. Thus, when the spindle 20 is slanted, a machining defect may possibly occur. Therefore, by giving an error notification when the spindle 20 is slanted, it is possible to prevent a workpiece from being cut with a machining defect.

While the X reference point M_X, the Y reference point M_Y, the Z reference point M_Z and the measurement points P1 and P2 are pre-set on the surface of the correction jig 100 in the preferred embodiment described above, they may be set on another component of the machining device 10. The X reference point M_X, the Y reference point M_Y, the Z reference point M_Z and the measurement points P1 and P2 may be set on the surface of the support 16 or the magazine 30, for example.

The X reference point M_X, the Y reference point M_Y, the Z reference point M_Z and the measurement points P1 and P2 may be the same point, or some or all of them may be different points.

In the flow chart of FIG. 7 of the preferred embodiment described above, step S702 to step S716 are performed in this order. However, for step S702 to step S716, the order of steps may be changed as necessary.

Note that the sections of the controller 40 of the preferred embodiment described above, i.e., the storage 41, the X correction value determiner 42 (specifically, the first X coordinate obtainer 51, the second X coordinate obtainer 52, the X correction value calculator 53), the Y correction value determiner 44 (specifically, the first Y coordinate obtainer 55, the second Y coordinate obtainer 56, the Y correction value calculator 57), the actual length determiner 46 (specifically, the first Z coordinate obtainer 61, the second Z coordinate obtainer 62, the actual length calculator 63), the Z correction value determiner 48 and the positioner 49, may each be implemented by software. That is, these sections may each be implemented by a computer to which a computer program is loaded. Preferred embodiments of the present invention include computer programs that cause the computer to function as these sections, and computer-readable storage media storing such computer programs. These sections may each be implemented by a processor executing a computer program stored in the controller 40. In such a case, each section may be implemented by one processor or may be implemented by a plurality of processors. Preferred embodiments of the present invention also include a circuit or circuits that implements similar functions to the programs to be executed by these sections.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A machining device placed in a space of an XYZ rectangular coordinate system capable of positioning a plurality of components of the machining device using a detection tool, and determining a correction value for a coordinate value of a measurement point that is pre-set for the positioning, the machining device comprising:
   a clamp that is capable of selectively clamping one of a machining tool and a detection tool;
   a spindle provided on the clamp and extending in a Z-axis direction;
   a support that is capable of selectively supporting one of a workpiece and a correction jig;
   a conveyor that is capable of moving the clamp in three-dimensional directions relative to the support; and
   a controller; wherein
   an X reference point located at an end in an X-axis direction and a Y reference point located at an end in a Y-axis direction are pre-set on a surface of either one of the correction jig and the support; and
   the controller includes:
      a storage to store a design length of the detection tool;
      an X correction value determiner to determines an X correction value, which is the correction value for the X-axis direction, based on an X coordinate value obtained when the detection tool clamped by the clamp is brought into contact with the X reference point;
      a Y correction value determiner to determine a Y correction value, which is the correction value for the Y-axis direction, based on a Y coordinate value obtained when the detection tool clamped by the clamp is brought into contact with the Y reference point;
      an actual length determiner to determine an actual length in the Z-axis direction of the detection tool clamped by the clamp by measuring the actual length of the detection tool; and
      a Z correction value determiner to determine a Z correction value, which is the correction value for the Z-axis direction, based on the X correction value, the Y correction value, the actual length of the detection tool and the design length of the detection tool.

2. The machining device according to claim 1, wherein the Z correction value determiner determines the Z correction value by an expression as follows:

$$S_{mz} = T_L^{org} - T_L^{org} \cos \theta$$

$$= T_L^{org}(1-\cos \theta)$$

$$\therefore D_z = ((S_{mx})^2 + (S_{my})^2)^{1/2},$$

$$T_L \tan \theta = D_z$$

$$\theta = \tan^{-1}(D_z/T_L) \text{ [rad]}$$

where $S_{mx}$ is the X correction value, $S_{my}$ is the Y correction value, $S_{mz}$ is the Z correction value, $T_L$ is the actual length of the detection tool, and $T_L^{org}$ is the design length of the detection tool.

3. The machining device according to claim 1, wherein the X correction value determiner includes:
   a first X coordinate obtainer to obtain a first X coordinate value when the detection tool clamped by the clamp is brought into contact with the X reference point with a rotation angle of the spindle being 0°;
   a second X coordinate obtainer to obtain a second X coordinate value when the detection tool clamped by the clamp is brought into contact with the X reference point with the rotation angle of the spindle being 180°; and
   an X correction value calculator to calculate the X correction value based on an expression as follows:

$$S_{mx} = (M\_X1 \cdot x - M\_X1(180) \cdot x)/2$$

where $S_{mx}$ is the X correction value, $M\_X1 \cdot x$ is the first X coordinate value, and $M\_X1(180) \cdot x$ is the second X coordinate value.

4. The machining device according to claim 1, wherein the Y correction value determiner includes:
   a first Y coordinate obtainer to obtain a first Y coordinate value when the detection tool clamped by the clamp is brought into contact with the Y reference point with a rotation angle of the spindle being 0°;
   a second Y coordinate obtainer to obtain a second Y coordinate value when the detection tool clamped by the clamp is brought into contact with the Y reference point with the rotation angle of the spindle being 180°; and
   a Y correction value calculator to calculate the Y correction value based on an expression as follows:

$$S_{my} = (M\_Y1 \cdot y - M\_Y1(180) \cdot y)/2$$

where $S_{my}$ is the Y correction value, $M\_Y1 \cdot y$ is the first Y coordinate value, and $M\_Y1(180) \cdot y$ is the second Y coordinate value.

5. The machining device according to claim 1, wherein
   a Z reference point located at an end in the Z-axis direction is pre-set on a surface of either one of the correction jig and the support; and
   the actual length determiner includes:
      a first Z coordinate obtainer to obtain a first Z coordinate value when the clamp that is not clamping the machining tool or the detection tool is brought into contact with the Z reference point;
      a second Z coordinate obtainer to obtain a second Z coordinate value when the detection tool clamped by the clamp is brought into contact with the Z reference point; and
      an actual length calculator to calculate the actual length of the detection tool based on an expression as follows:

$$T_L = M\_Z2 - M\_Z1$$

where $T_L$ is the actual length of the detection tool, $M\_Z1$ is the first Z coordinate value, and $M\_Z2$ is the second Z coordinate value.

6. The machining device according to claim 1, wherein
   a contact point refers to a point on the detection tool to be in contact with the X reference point, and another contact point refers to a point on the detection tool to be in contact with another measurement point for positioning of which a Z coordinate value is different from the X reference point;
   another X correction value refers to a correction value for an X coordinate value of the other measurement point, and another Y correction value refers to a correction value for a Y coordinate value of the other measurement point;

the X correction value determiner determines the other X correction value by multiplying together the X correction value and a predetermined coefficient; and
the Y correction value determiner determines the other Y correction value by multiplying together the Y correction value and the predetermined coefficient.

7. The machining device according to claim 6, wherein
a contact design length refers to a design length from a tip of the detection tool clamped by the clamp to the contact point of the detection tool;
another contact design length refers to a design length from the tip of the detection tool clamped by the clamp to the other contact point of the detection tool;
the contact design length and the other contact design length are stored in the storage; and
the predetermined coefficient is calculated based on an expression as follows:

$$k = (T_L^{calc} - A_L)/(T_L^{calc} - M_L)$$

$$\therefore T_L^{calc} = T_L/\cos\theta$$

where k is the predetermined coefficient, $M_L$ is the contact design length, and $A_L$ is the other contact design length.

8. A correction value determination method for use with a machining device placed in a space of an XYZ rectangular coordinate system capable of positioning a plurality of components of the machining device using a detection tool, wherein the method is for determining a correction value for a coordinate value of a measurement point that is pre-set for the positioning, wherein the machining device includes a clamp that is capable of clamping the detection tool, and an X reference point and a Y reference point are pre-set on the machining device, the method comprising:
an X correction value determining step of determining an X correction value, which is the correction value for an X-axis direction, based on an X coordinate value when the detection tool clamped by the clamp is brought into contact with the X reference point;
a Y correction value determination step of determining a Y correction value, which is the correction value for a Y-axis direction, based on a Y coordinate value when the detection tool clamped by the clamp is brought into contact with the Y reference point;
an actual length determination step of determining an actual length in a Z-axis direction of the detection tool clamped by the clamp by measuring the actual length of the detection tool; and
a Z correction value determination step of determining a Z correction value, which is the correction value for the Z-axis direction, based on the X correction value determined in the X correction value determining step, the Y correction value determined in the Y correction value determination step, the actual length of the detection tool determined in the actual length determination step, and a design length of the detection tool.

9. The correction value determination method according to claim 8, wherein
the Z correction value is determined in the Z correction value determination step based on an expression as follows:

$$S_{mz} = T_L^{org} - T_L^{org}\cos\theta$$

$$= T_L^{org}(1-\cos\theta)$$

$$\therefore D_z = ((S_{mx})^2 + (S_{my})^2)^{1/2},$$

$$T_L \tan\theta = D_z$$

$$\theta = \tan^{-1}(D_z/T_L) \text{ [rad]}$$

where $S_{mx}$ is the X correction value, $S_{my}$ is the Y correction value, $S_{mz}$ is the Z correction value, $T_L$ is the actual length of the detection tool, and $T_L^{org}$ is the design length of the detection tool.

10. The correction value determination method according to claim 8, wherein
the detection tool is rotatable about an axis extending in the Z-axis direction;
the X correction value determining step includes:
a first X coordinate obtaining step of obtaining a first X coordinate value when the detection tool clamped by the clamp is brought into contact with the X reference point with a rotation angle of the detection tool being 0°;
a second X coordinate obtaining step of obtaining a second X coordinate value when the detection tool clamped by the clamp is brought into contact with the X reference point with the rotation angle of the detection tool being 180°; and
an X correction value calculating step of calculating the X correction value based on an expression as follows:

$$S_{mx} = (M\_X1 \cdot x - M\_X1(180) \cdot x)/2$$

where $S_{mx}$ is the X correction value, $M\_X1 \cdot x$ is the first X coordinate value, and $M\_X1(180) \cdot x$ is the second X coordinate value.

11. The correction value determination method according to claim 8, wherein
the detection tool is rotatable about an axis extending in the Z-axis direction; and
the Y correction value determination step includes:
a first Y coordinate obtaining step of obtaining a first Y coordinate value when the detection tool clamped by the clamp is brought into contact with the Y reference point with a rotation angle of the detection tool being 0°;
a second Y coordinate obtaining step of obtaining a second Y coordinate value when the detection tool clamped by the clamp is brought into contact with the Y reference point with the rotation angle of the detection tool being 180°; and
a Y correction value calculation step of calculating the Y correction value based on an expression as follows:

$$S_{my} = (M\_Y1 \cdot y - M\_Y1(180) \cdot y)/2$$

where $S_{my}$ is the Y correction value, $M\_Y1 \cdot y$ is the first Y coordinate value, and $M\_Y1(180) \cdot y$ is the second Y coordinate value.

12. The correction value determination method according to claim 8, wherein
a Z reference point is pre-set on the machining device; and
the actual length determination step includes:
a first Z coordinate obtaining step of obtaining a first Z coordinate value when the clamp that is not clamping the detection tool is brought into contact with the Z reference point;
a second Z coordinate obtaining step of obtaining a second Z coordinate value when the detection tool clamped by the clamp is brought into contact with the Z reference point; and
an actual length calculation step of calculating the actual length of the detection tool based on an expression as follows:

$$T_L = M\_Z2 - M\_Z1$$

where $T_L$ is the actual length of the detection tool, M_Z1 is the first Z coordinate value, and M_Z2 is the second Z coordinate value.

13. The correction value determination method according to claim 8, wherein
a contact point refers to a point on the detection tool to be in contact with the X reference point, and another contact point refers to a point on the detection tool to be in contact with another measurement point for positioning of which a Z coordinate value is different from the X reference point;
another X correction value refers to a correction value for an X coordinate value of the other measurement point, and another Y correction value refers to a correction value for a Y coordinate value of the other measurement point;
the X correction value determining step determines the other X correction value by multiplying together the X correction value and a predetermined coefficient; and
the Y correction value determination step determines the other Y correction value by multiplying together the Y correction value and the predetermined coefficient.

14. The correction value determination method according to claim 13, wherein
a contact design length refers to a design length from a tip of the detection tool clamped by the clamp to the contact point of the detection tool;
another contact design length refers to a design length from the tip of the detection tool clamped by the clamp to the other contact point of the detection tool; and
the predetermined coefficient is calculated based on an expression as follows:

$$k=(T_L^{calc}-A_L)/(T_L^{calc}-M_L)$$

$$\therefore T_L^{calc}=T_L/\cos\theta$$

where k is the predetermined coefficient, $M_L$ is the contact design length, and $A_L$ is the other contact design length.

* * * * *